United States Patent
Chatellier et al.

(10) Patent No.: US 6,375,845 B1
(45) Date of Patent: Apr. 23, 2002

(54) METHOD FOR EVALUATING AND CONTROLLING THE BIOMASS CONTAINED IN WASTE WATER TREATMENT BIOLOGICAL TANKS

(75) Inventors: Patrice Chatellier, Paris; Philippe Caulet, Bailly, both of (FR)

(73) Assignee: Suez-Lyonnaise des Eaux, Nanterre Cedex (FR)

( * ) Notice: Subject to any disclaimer, the term of this patent is extended or adjusted under 35 U.S.C. 154(b) by 0 days.

(21) Appl. No.: 09/509,761
(22) PCT Filed: Sep. 23, 1998
(86) PCT No.: PCT/FR98/02048
§ 371 Date: Mar. 31, 2000
§ 102(e) Date: Mar. 31, 2000
(87) PCT Pub. No.: WO99/18035
PCT Pub. Date: Apr. 15, 1999

(30) Foreign Application Priority Data

Oct. 2, 1997 (FR) ............................................. 97 12282

(51) Int. Cl.[7] .................................................. C02F 3/30
(52) U.S. Cl. ........................ 210/614; 210/620; 210/739; 210/744
(58) Field of Search ................................ 210/620, 630, 210/614, 739, 745, 746

(56) References Cited

FOREIGN PATENT DOCUMENTS

WO  WO-97/00832 A1 * 1/1997

* cited by examiner

Primary Examiner—Chester T. Barry
(74) Attorney, Agent, or Firm—Connolly Bove Lodge & Hutz LLP

(57) ABSTRACT

This method uses the on/off sequences of an aeration system of treatment basins. The sequences are imposed by the running of a treatment process, to estimate the respiration of biomass, the latter being measured during non-aeration phases. There is an initial determination, from the concentration of dissolved oxygen, of the change in the amount of oxygen contained in the aeration basin. There is a subsequent determination of the amount of oxygen leaving the aeration basin, the amount of oxygen entering the basin during the non-aeration phase being regarding as zero. Next is a determination, on the basis of the information collected in the above steps, of the respiratory capacity of the purifying biomass. There is then a determination of the mass of suspended matter in the purifying biomass and calculation, from the respiratory capacity of the biomass and from the sludge concentration, of the amount of oxygen consumed per unit mass of biological sludge and per unit time.

5 Claims, 1 Drawing Sheet

METHOD FOR EVALUATING AND CONTROLLING THE BIOMASS CONTAINED IN WASTE WATER TREATMENT BIOLOGICAL TANKS

FIELD OF THE INVENTION

The present invention relates to a method of evaluating the biomass contained in basins of biological wastewater treatment plants, especially for the purpose of monitoring the efficiency of the aeration system of such basins.

BACKGROUND OF THE INVENTION

The method according to the invention is based on measuring the respiratory activity of the purifying biomass and it applies to the case in which the aeration of the basin is carried out by on/off sequences of the aeration system, thus allowing regulation of the aerobic biological systems, which is based on various physical measurements having the advantage of being rapidly obtainable and therefore of lending themselves to in-line regulation. According to the invention, these physical measurements relate to:

the concentration of dissolved oxygen in the aeration basin;

the concentration of activated sludge of the mixed liquor contained in this aeration basin; and the flow rate of the effluent through the aeration basin, (Qt+Qr).

From this data, the invention makes it possible to obtain quite a range of fundamental information about the status of the purification station, information which derives in fact from the "consumption of oxygen per kilo of suspended matter (sludge) and per hour" characteristic which constitutes a parameter representative of the respiratory activity of the biomass, the VM (volatile matter)/SM (suspended matter) ratio being approximately constant.

This information about the operation of the treatment plant may, for example, be:

the oxygen demand of the sludge, which will make it possible to provide the suitable aeration of the purification station;

the detection of pollution overloads compared with the biological purifying capacity present in the basin and therefore the risk of degraded operation of the station;

adjustments to the rate of extraction of this sludge, depending on this fundamental characteristic, which is the "age of the sludge", and on the values that it must take according to whether the operator wishes or does not wish to favour the elimination of nitrogenous pollution in conjunction with carbonaceous pollution.

As a consequence of the European directives, the techniques currently employed in wastewater-purification stations aim to limit discharges into the natural environment of untreated wastewater, these stations having to treat all collected water apart from that resulting from exceptional downpours.

Such treatment stations have the common characteristic of employing a plant for purification by activated sludge, which includes an aeration basin in which oxygen is transferred into the water/biomass mixture, this transfer being necessary for the development of the purifying biomass.

Furthermore, the abovementioned European directives require greater reliability of the purification stations and therefore mean that the operation of the stations must be strictly monitored and maintained in the best possible state of operation, with maximum available purifying capacity.

The discharge into the natural environment of an effluent of constant quality has to be met within a context in which the composition of the wastewater to be treated varies very significantly, both as regards the pollution load and the flow rate. It is therefore necessary, in order to keep the purification station in the best possible state of operation, to permanently adapt the operating criteria in order to respond to the modifications to the operating constraints on the biological treatment. The new operating criteria, chosen following these adaptations, must not degrade the quality of the biomass. This is because keeping a high-quality biomass in the biological treatment is essential in order to ensure a future proper operation of the treatment unit. Frequent monitoring of the quality of the biomass therefore provides important information for running the process. This quality is essentially reflected by the respiratory activity of the biomass.

At the present time, the running of the plants rarely takes into account the respiratory activity of the biomass, at least with regard to continuous monitoring of the said respiratory activity and of its use for the purposes of adjusting the operation of the stations. The operator is often content to carry out delayed cyclic sludge extractions so as to maintain a "calculated" sludge age compatible with the required treatments. Automatic regulating devices are also employed which use the information from a probe or from a respirometer, but in all cases the measurements are carried out on samples taken from the station and analysed in an external confined environment, for example the most conventional being the Warburg respirometry measurement.

Such systems may, because of their logic, cause chronic underoxygenation of the biomass. This is because the automatic devices regulate or control on the basis of measurements made in a medium which is favourable to the development of the biomass specimens and therefore does not take into account the actual operating conditions of the purification basins: this may lead to "optimistic" evaluations of the quality of the biomass and, consequently, may disturb the response of the automatic device. Another case of chronic underoxygenation may occur, for example, in the case of systems for regulating the aeration which rely on measuring the oxydoreduction potential and are installed on stations which include a physico-chemical dephosphatization of the effluents.

WO 97/00832 relates to the so-called SDR (Sequencing Batch Reactor) process, which operates in batch mode and only allows the oxygen provided in the plant to be managed. This prior process does not make it possible to solve the technical problem solved by the present invention, especially with regard to monitoring the efficiency of the aeration system, the pollution inflows and the sludge purges of the plant.

GB-A-2,184,110 relates to a system allowing the concentration of dissolved oxygen in a biological reactor to be monitored, together with monitoring of the reduced oxygen kinetics in the absence of aeration, an alarm being triggered when this reduction does not correspond to a predetermined set value. This prior publication is aimed neither at managing the aeration nor managing the sludge purges.

DE-A-3,543,408 describes a process for purifying wastewater by means of activated sludge, in which, during the aeration phase, the oxygen concentration in the activated-sludge basin is measured and the number of oxygen-supply devices is actuated depending on the measured values. This prior publication only relates to managing the sequencing of the aeration of an activated-sludge basin without there being any question of managing the sludge purges.

BRIEF DESCRIPTION OF THE INVENTION

The object of the invention is to provide a method of evaluating the respiratory activity of the biomass, something which is not envisaged in any of the publications analysed above, this process, which furthermore does not have the drawbacks of the solutions of the prior art, carrying out this evaluation in situ and in vivo so as to be perfectly representative of the living conditions in the purification basins.

The method of evaluation and of monitoring the biomass contained in the biological wastewater treatment basin according to the invention is characterized in that it uses the on/off sequences of the aeration system of the treatment basins, which sequences are imposed by the running of the process, to estimate the biomass respiration, the latter being measured during the non-aeration phases, according to the following steps:

a) determination, using a probe for measuring the concentration of dissolved oxygen, of the change in the amount of oxygen contained in the aeration basin, that is to say its reduction according to the respiratory activity of the purifying biomass or biological sludge of the basin;

b) determination of the amount of oxygen leaving the basin in the throughput, the amount of oxygen entering the basin during the non-aeration phase being regarded as zero;

c) determination, on the basis of the information collected in steps a) and b), of the respiratory capacity of the purifying biomass;

d) determination of the mass of suspended matter in the sludge using a sludge-concentration sensor;

e) calculation, from the respiratory capacity of the biomass and from the sludge concentration, of the amount of oxygen consumed per unit mass of biological sludge and per unit time, that is to say the specific respiratory activity of the purifying biomass.

According to the invention, the specific respiratory activity of the biomass thus calculated is used to readjust the operating parameters of the purification station.

BRIEF DESCRIPTION OF THE DRAWING

The single FIGURE of the appended drawing is a schematic representation of a purification plant employing the method of the invention and showing the location of the probes for measuring the concentration of oxygen and of suspended matter.

DETAILED DESCRIPTION OF THE INVENTION

Figure 1:
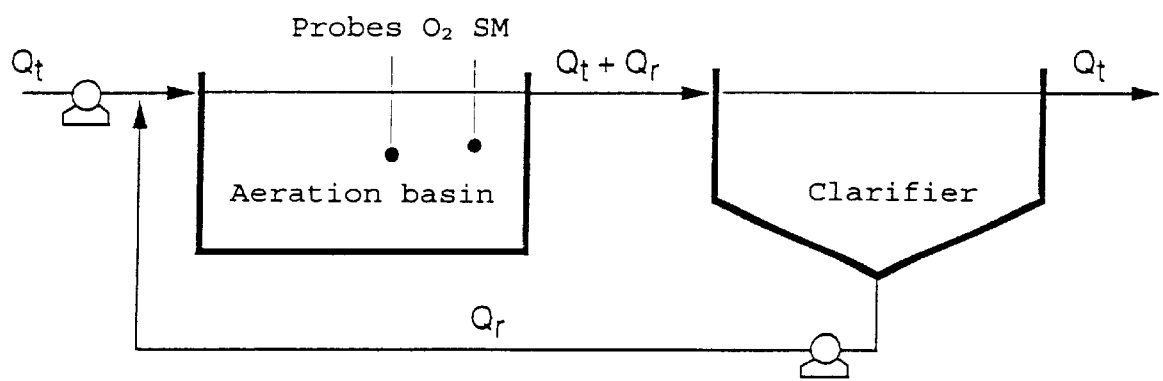

The probe used for the oxygen measurement may, for example, be a polarographic probe measuring the concentration of dissolved oxygen using a pair of noble metals immersed in an electrolyte, which produces an electric current whose intensity depends on the concentration of dissolved oxygen.

The mass of suspended matter in the activated sludge is measured by a SM probe, for example of the type using an infrared absorption measurement which is correlated to the concentration of suspended matter.

Moreover, the monitoring technique used in the invention requires only a single flowmeter for measuring the flow $Q_t+Q_r$ passing through the aeration basin, a dissolved-oxygen probe and a probe for measuring the concentration of suspended matter in order to determine the specific respiratory activity of the purifying biomass (FIG. 1). The said invention relies on analysing the normal operation of the plant, in the absence of any modification to the operating conditions, all the measurements being carried out in situ and in vivo.

This characteristic distinguishes the invention from many other devices already developed ["Evaluation of activated-sludge oxygen-uptake rate test procedures", by S. C. Chiesa, M. G. Rieth and T. E. K. L. Ching, Journal of Environmental Engineering, 116, No. 3, 472–486; 1990]. This is because these devices generally require the use of special measurement cells (respirometers) or of techniques difficult to incorporate and requiring permanent intervention by specialized analytical technicians, such as the gas-balance method.

Another advantageous characteristic of the present invention is that it allows in situ measurement, thereby making it possible to take into account the influence of the biomass on the amount of oxygen transferred.

With regard to the fields of application of the present invention, mention may be made, without this list being exhaustive, the following applications:

knowing the respiration makes it possible to modify the paramaterization of the system for regulating the aeration. Measuring the respiration of the biomass therefore allows any drift in the purification system to be detected and allows the parameters of the regulating device to be readjusted;

knowing the respiration of the biomass may allow the rate of extraction of the said biomass to be controlled. This is because the rate of extraction determines the age of the biomass and consequently the respiration. An abnormally high rate of extraction or too great an increase in this rate would entail sludge ages which are too low and therefore abnormally high respiration values;

detection of accidental pollution: an abnormal increase in the respiration of the biomass may also indicate the influx of an accidental pollution. Such a pollution may, if it is capable of endangering the future operation of the plant, cause the feed to the purification station to be stopped and the suspect effluent to be sent to another location.

Of course, it remains to be stated that the present invention is not limited to the embodiments described and/or illustrated here, but it encompasses all the variants thereof which fall within the scope of the invention as defined by the appended claims.

What is claimed is:

1. Evaluation method of monitoring the purifying biomass contained in a treatment basin of a wastewater treatment station during on/off sequences of an aeration system of a treatment basin, to estimate the biomass respiration according to the following steps:

a) measuring the concentration of dissolved oxygen in the aeration basin, for determining the reduction of concentrated dissolved oxygen in the basin, solely during a non-aeration sequence according to the respiratory activity of purifying biomass in the basin;

b) determination of the amount of oxygen leaving the aeration basin, the amount of oxygen entering the basin during the non-aeration phase being regarded as zero;

c) determination, on the basis of the information collected in steps a) and b), of the respiratory capacity of the purifying biomass;

d) determination of the mass of suspended matter in the purifying biomass;

e) calculation, from the respiratory capacity of the biomass and from sludge concentration, of the amount of oxygen consumed per kilogram of suspended matter and per unit time, corresponding to the specific respiratory activity of the purifying biomass; and f) using the specific respiratory activity of the purifying biomass thus measured in order to readjust preselected operating parameters of the treatment station.

2. Method according to claim 1, wherein the step of measuring the concentration of dissolved oxygen is achieved by subjecting a polarographic probe to contents of the basin.

3. Method according to claim 1, wherein the step of measuring the concentration of suspended matter in the biomass is achieved by subjecting an infrared absorption measurement probe to the contents of the basin.

4. Method according to claim 1, wherein the respiratory activity of the biomass controls the rate of extraction of the biomass.

5. Method according to claim 1, wherein the respiratory activity of the biomass above a preselected threshold corresponds to accidental pollution.

* * * * *